United States Patent [19]

Thayer, Jr.

[11] Patent Number: 4,804,983
[45] Date of Patent: Feb. 14, 1989

[54] PHOTOGRAPHY BOOTH AND METHOD

[76] Inventor: Donald O. Thayer, Jr., 153 Lincoln St., Garden City, N.Y. 11530

[21] Appl. No.: 932,365

[22] Filed: Nov. 19, 1986

[51] Int. Cl.$^4$ .................... G03B 13/02; G03B 29/00
[52] U.S. Cl. ..................... 354/76; 354/219; 354/224; 354/290; 358/213.13; 358/224
[58] Field of Search ............ 354/75, 76, 77, 80, 354/155, 219, 220, 290, 224, 225; 358/213.13, 224, 909

[56] References Cited

U.S. PATENT DOCUMENTS

| | | | |
|---|---|---|---|
| 1,794,142 | 2/1931 | Boston | 354/290 |
| 1,795,051 | 3/1931 | Simjian | 354/290 |
| 1,830,770 | 11/1931 | Simjian | 354/290 |
| 3,114,002 | 3/1963 | Siepmann et al. | 354/254 X |
| 3,546,378 | 5/1970 | Karikawa | 354/75 X |
| 3,812,506 | 5/1974 | Klebanow | 354/80 |
| 3,883,883 | 5/1975 | Sano et al. | 354/75 |
| 3,913,116 | 10/1975 | Kastner et al. | 354/223 |
| 3,921,189 | 11/1975 | Gallistel | 354/220 |
| 4,131,354 | 12/1978 | Hagiwara | 354/224 |
| 4,297,724 | 10/1981 | Masuda | 359/93 |
| 4,303,322 | 12/1981 | Someya | 354/219 |
| 4,560,261 | 12/1985 | Ueda | 354/121 |
| 4,705,374 | 11/1987 | Robings | 354/225 |

FOREIGN PATENT DOCUMENTS

| | | |
|---|---|---|
| 233736 | 8/1987 | European Pat. Off. . |
| 1993351 | 9/1968 | Fed. Rep. of Germany . |
| 3018722 | 11/1981 | Fed. Rep. of Germany . |
| 106089 | 7/1973 | German Democratic Rep. . |
| 477703 | 10/1969 | Switzerland . |
| 1083128 | 9/1967 | United Kingdom . |

Primary Examiner—A. A. Mathews
Attorney, Agent, or Firm—Shlesinger, Arkwright & Garvey

[57] ABSTRACT

A self photography system includes a film camera having an image inlet and an image outlet and also includes a shutter assembly for selectively exposing a length of film to a viewed image. A video camera is coupled to the image outlet by a prism which assures transmission of the viewed image from the film camera to the video camera. A video monitor is connected with the video camera and displays the viewed image. A switch is associated with the shutter for causing a length of film to be selectively exposed with the viewed image which is being displayed on the video monitor.

17 Claims, 3 Drawing Sheets

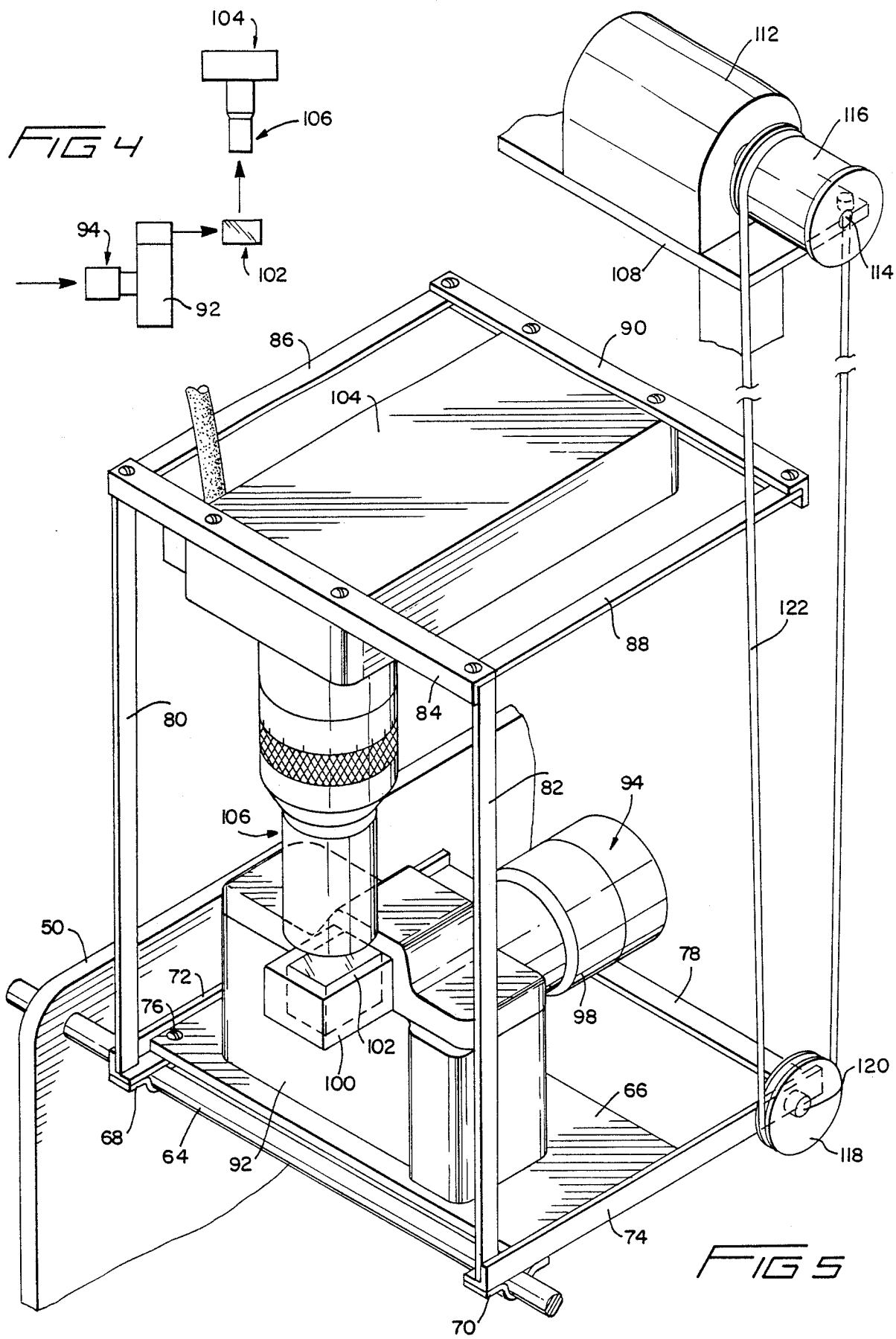

PHOTOGRAPHY BOOTH AND METHOD

BACKGROUND OF THE INVENTION

Individuals frequently wish to have a photograph taken of themselves which they have posed. In the past, an individual was forced to resort to a camera having a time delayed shutter or a booth equipped with a camera and a mirror. In both instances, however, the individual could not completely perceive the image prior to the film being exposed.

The prior art discloses a number of photography booths and the like having various systems to permit the user to somewhat observe an image to be photographed. Many such booths utilize a system of mirrors. The mirrors may be vertically adjustable to accommodate persons of varying height. These mirror systems do not generally result in acceptable photograph quality because the useer cannot be sure that the image perceived is the image to which the film is exposed.

In view of the above, it can be seen that there is a need for an improved self-photography device. Such a device should permit the user to be assured of the image to which the film is exposed. Such a device should permit the user to be assured that the image is centered, is the image which is desired and is of the desired pose.

The disclosed invention is a novel apparatus and method permitting self-photography. The invention utilizes a conventional single lens reflex film camera which has an externally mounted right angle prism directing the viewed image to a video camera. The video camera is connected to a monitor positioned closely proximate the lens of the film camera so that the user can observe the actual image which the film camera lens is receiving.

OBJECTS AND SUMMARY OF THE INVENTION

The primary object of the disclosed invention is a self-photography method and apparatus permitting the user to observe the actual image which is being received by the lens of the film camera and to which the film is exposed when the shutter is operated.

A self-photography system comprises a film camera having an image inlet and an image outlet and further includes a shutter assembly for selectively exposing a length of film to an image viewed through a lens. A right angle prism adjacent the outlet couples the lens to a video camera and assures transmission of the image viewed by the lens from the film camera to the video camera. A video monitor displays the viewed image which is received by the video camera. A remotely positioned switch is connected to the shutter assembly for causing a length of film to be exposed by the viewed image displayed by the video monitor.

The system further includes a pivotal platform to which the video camera and film camera are secured in a pre-set alignment. The lens of the film camera always is aligned with an aperture in the booth, which aperture is adjacent a seat on which the person to be photographed is seated. Because the platform is pivotal, then the vertical alignment of the lens can be adjusted in order to accommodate users of other than a single height.

Naturally, the system includes proper lights for providing sufficient illumination for the video camera, as well as strobe lights to provide illumination for the film camera. Preferably, a plurality of pulsating lights are disposed around the circumference of the opening through which the lens of the film camera extends in order to attract the attention of the person to be photographed to the lens.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 4 is a schematic view illustrating the principle of the invention;

FIG. 5 is a fragmentary perspective view illustrating the platform and pivoting assembly of the invention; and, FIG. 6 is a fragmentary side elevational view with portions broken away and partially in section further illustrating the pivoting mechanism of the invention.

DESCRIPTION OF THE INVENTION

Figure 1:
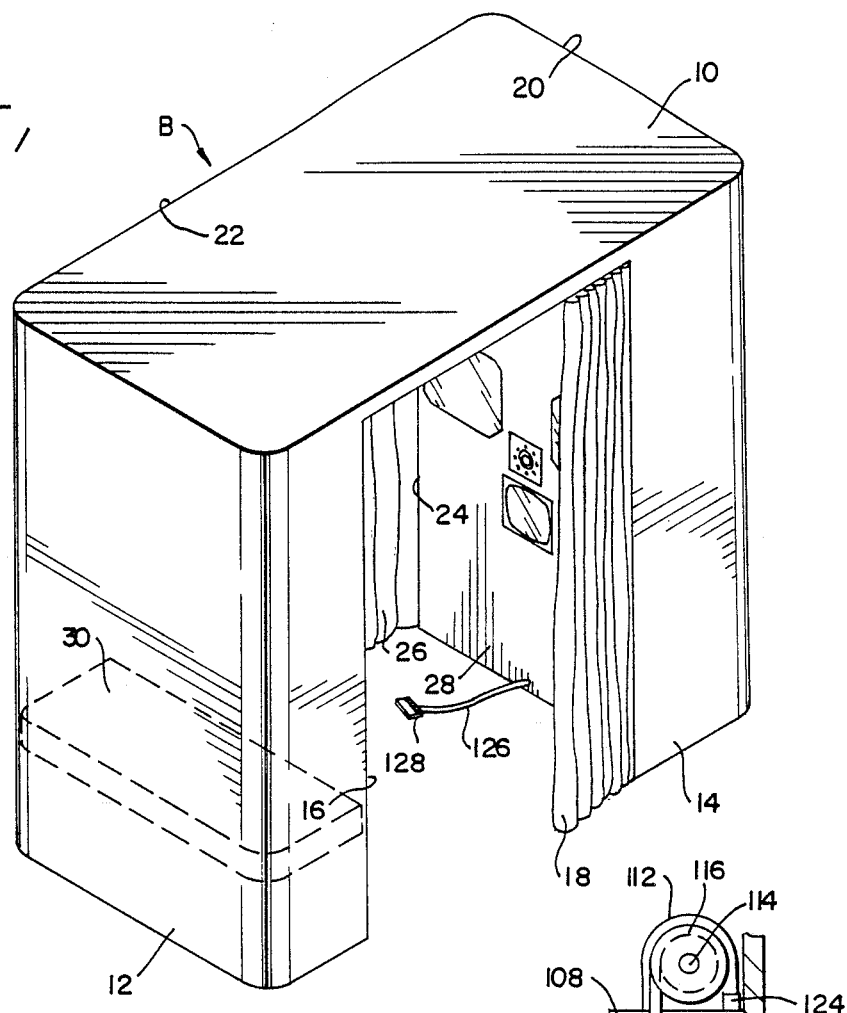
FIG. 1 is a perspective view illustrating the booth of the invention.

Booth B, as best shown in FIG. 1, includes a top 10, rear end wall 12 and first side wall 14. It can be noted in FIG. 1 that side wall 14 has an opening 16 therein which may be selectively blocked by movable curtain 18. Preferably the curtain 18 is of a heavy weight material which is substantially opaque to light to prevent entrance thereof into the booth B, as will be further explained. Booth B furthermore includes a front end wall 20 and a second side wall 22, which has an opening 24 therein which is also selectively blocked by movable curtain 26.

FIG. 1 furthermore discloses a front wall 28 disposed forwardly of front end wall 20 within the interior of booth B. Cushion 30 is illustrated in phantom in FIG. 1 and is spaced from but in alignment with front wall 28.

Figure 2:
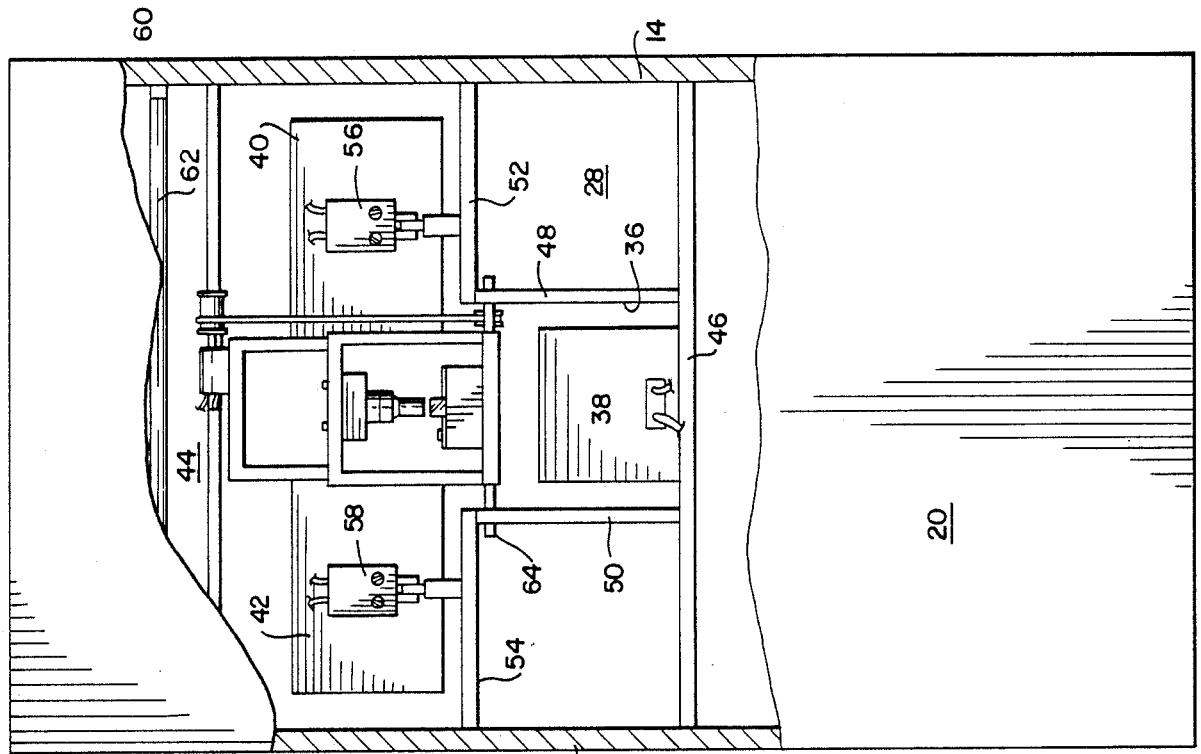
FIG. 2 is an elevational view of an interior end wall of the booth of FIG. 1.

FIG. 2 illustrates front wall 28. Front wall 28 has a first opening 32 therein to which cover plate 34 is affixed. Second opening 36 is disposed below opening 32 and video monitor 38, which is substantially the same as a conventional television, is positioned in opening 36. It can be noted in FIG. 2 that the openings 32 and 36 are closely disposed relative to each other, for reasons to be explained.

Panes 40 and 42 are mounted to front wall 28 adjacent each other and slightly above opening 32. The panes 40 and 42 are, preferably, manufactured of glass or suitable material which is substantially transparent to light. Likewise, cover pane 44 is also mounted to front wall 28 above panes 40 and 42 and substantially spans the distance between side walls 14 and 22. As with panes 40 and 42, cover pane 44 is manufactured from glass or other similar optically transparent material.

Figure 3:
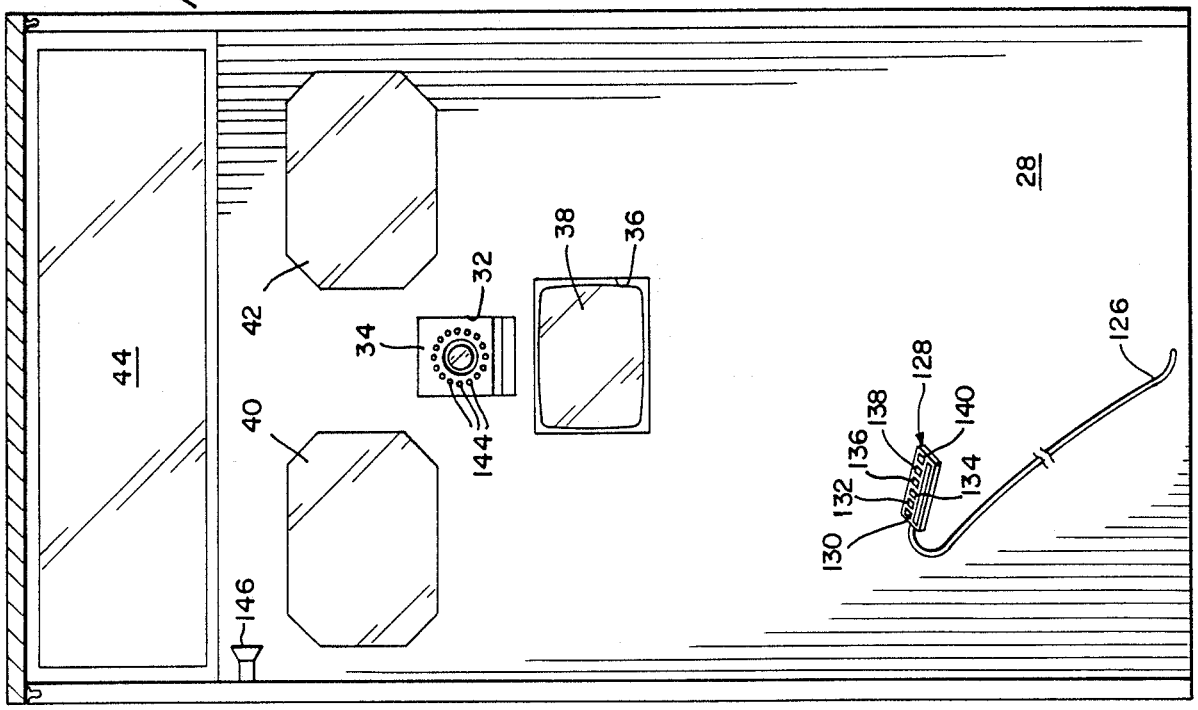
FIG. 3 is an elevational view with portions broken away of the exterior of the endwall of FIG. 1.

Horizontal support 46 extends between the side walls 14 and 22 and end wall 20 and front wall 28, as best shown in FIG. 3. Spaced parallel vertical supports 48 and 50 extend from horizontal support 46 on either side of opening 36 and terminate short of opening 32. Horizontal support 52 extends from vertical support 48 to side wall 14 and support 54 extends from vertical support 50 to side wall 22.

Strobes 56 and 58 are mounted to the supports 52 and 54, respectively, and are aligned with the panes 40 and 42, respectively. The strobes 56 and 58 are of a type conventionally used by photographers and provide a sudden intense burst of illumination. The strobes 56 and 58 are sized and selected to provide sufficient illumination for a user of the booth B, when seated on the seat 30, to have a properly illuminated photograph taken thereof.

Fixture 60 is secured to side wall 14 and a corresponding fixture 60 is secured to side wall 22. A color balanced bulb 62 extends between the aligned fixtures 60 and provides illumination corresponding substantially to daylight. The light of the bulb 62 shines through the cover pane 44, preferably at all times. Those skilled in the art will appreciate that more than one bulb 62 is normally used, there being a sufficient number of bulbs to provide adequate illumination for the interior of the booth B.

Rod 64 extends between the vertical supports 48 and 50 and defines a pivot axis for platform 66 which is disposed rearwardly of the front wall 28 and proximate endwall 20. As best shown in FIG. 5, brackets 68 and 78 are secured to rod 64 and horizontal members 72 and 74 extend therefrom, respectively. Platform member 66 is secured to the members 72 and 74, preferably by screws 76. A brace 78 extends between the members 72 and 74 at the ends thereof opposite the rod 64. Vertical supports 80 and 82 extend from the members 72 and 74, respectively, and are maintained in spaced apart parallel relation by member 84 extending therebetween. Horizontal members 86 and 88 extend therefrom, on opposite sides thereof, and are likewise maintained in spaced apart parallel relation by member 90.

Film camera 92 is secured to platform 66 and includes a lens 94 extending forwardly therefrom. The lens 94 is aligned with the opening 32. The camera 92 furthermore includes a conventional shutter assembly 96, as best shown in FIG. 6, which is connected with zoom lens 98.

Preferably, film camera 92 is of the single lens reflex type wherein the user looks through the lens 94 by means of an eyepiece. The conventional optical glass eyepiece is removed and is replaced with a housing 100 at the rear of camera 92. Right angle prism 102 is mounted in housing 100 so that the image perceived by the lens 94 is directed vertically upon exiting the camera 92, rather than horizontally parallel to the lens 94, as would normally be the case. In this way, the prism 102 couples the camera outlet with the video camera lens 106 and assures that the perceived image is diverted to the video camera 104. The optical glass of the view piece is removed because I have learned that too much light loss occurs when this eyepiece is in place.

Video camera 104 is secured to the members 84 and 90 and has a lens assembly 106 with an image opening which is in alignment with the right angle prism 102. In this way, the image received by the lens 94 is transmitted by the prism 102 to the lens 106 of the video camera 104. Because the members 90 and 84 are secured to the members 80 and 82, the alignment of the lens 106 with the prism 102 is always maintained in proper orientation. Therefore, the platform 66 may pivot on the axis defined by the rod 64.

Figure 6:
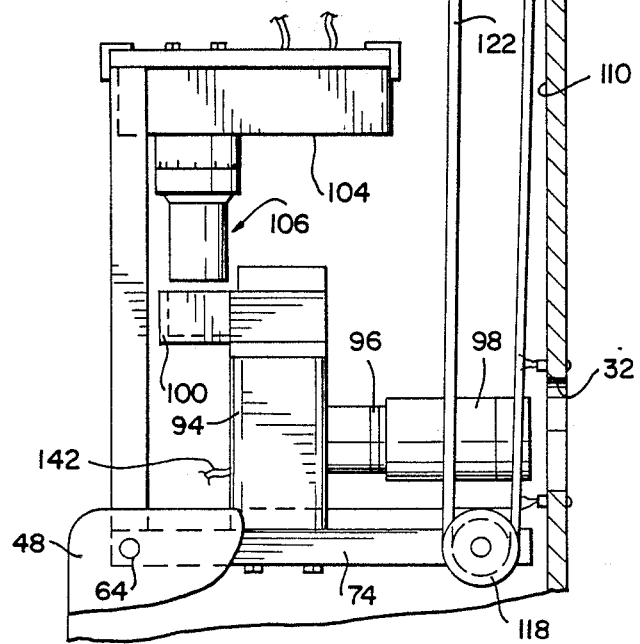

As best shown in FIG. 6, support 108 is secured to the rear surface 110 of front wall 28. Motor drive 112 is mounted to support 108 and has a rotatable shaft 114 to which reel 116 is secured.

Sheave 118 is rotatably mounted to member 74 by rod 120, as best shown in FIG. 5. Cord 122 has several wraps thereof wound about reel 116 and extends therefrom about sheave 118. The remote end 124 of the cord 122 is secured to the support 108. In this way, rotation of the shaft 114 causes the cord to be wrapped upon or from, depending upon the rotation of the shaft 114, the reel 116 so that the changes in length thereof causes the rod 64 to pivot about its axis, and thereby angularly displace the platform 66, and hence the vertical positioning of the lens 94.

FIG. 4 illustrates the path which the image perceived by the lens 94 takes prior to being displayed on the video monitor 38. Because the camera 92 is of the type wherein the user sights through the lens 94, then the image received by the video camera 104 is the same as that to which the film in the camera 92 would be exposed upon the shutter assembly 96 being operated. The video monitor 38 therefore displays the actual image which is sighted in the lens 94. The user can therfore be assured that the image being displayed on the monitor 38 is the actual image which will be exposed to the film contained in the camera 92.

Control cable 126, as best shown in FIG. 2, extends from front wall 28 and is connected to control module 128. Module 128 includes pivot up button 130, pivot down button 132, zoom in button 134 and zoom out button 136. Control module 128 furthermore includes horn button 138 and shutter operator button 140.

The up and down buttons 130 and 132, respectively, are each in electrical connection with motor drive 112 and cause the shaft 114 to rotate in order to take up or let out the cord 122, and thereby cause pivoting of the platform 66. The zoom in and zoom out buttons 134 and 136, respectively, are connected through control cable 142 to the zoom lens 98. The shutter operator button 140 is connected by the control cable 142 to the shutter assembly 96, as best shown in FIG. 6. In this way, the operator can pivot the platform up and down in order to vertically adjust the image which is perceived by the lens 94. Likewise, operation of the buttons 136 and 138 causes the lens 98 to be appropriately adjusted.

As best shown in FIG. 2, LED's 144 extend annularly about the cover plate 34 with respect to the lens 94. Preferably, the LED's 144 pulsate in a rhythmic pattern in order to draw the attention of the person to be photographed to the lens 94. This assures that the person to be photographed is looking into the lens 94, a feature particularly important when the control module 128 is being operated by a person other than the one whose picture is being taken.

Horn 146 is connected to the horn button 138 and is activated thereby in order to draw the attention of the person seated on the seat 30 toward the front wall 28. Such a feature is particularly desirable with children who might otherwise not be looking forwardly, let alone toward the lens 94.

Preferably the video monitor 38 is disposed closely proximate the lens 94. This is advantageous because it is important that the person who is being photographed not have the eyes looking downwardly, such as could occur if the video monitor 38 was spaced a large distance from the lens 94. Having the lens 94 closely disposed relative to the monitor 38 assures that an individual can be photographed properly and yet be able to look into the lens 94 and at the monitor 38.

OPERATION

Operation of the booth B for self-photography is relatively simple and straightforward. The person to be photographed need merely enter through the opening 16 and be seated on the cushion 30. The curtains 18 and 26 are then closed in order to substantially eliminate external illumination which could otherwise detract from the quality of the photograph. The bulbs 62 are color balanced to simulate daylight in order to provide a natural appearing photograph, particularly when the strobes 56 and 58 are activated.

The person to be photographed aligns or poses before the lens 94 and views the image perceived by the lens 94 in the monitor 38. Because of the close positioning of the monitor 38 to the lens 94, then the image displayed corresponds with the image perceived by the lens 94. As previously explained, the optical system provided by the right angle prism 92 is such that the image perceived by the lens 94 is transmitted to the video camera 104, and hence to the monitor 38.

The user can pivot the platform upwardly or downwardly, as well as zoom in or zoom out as may be required until a preferred pose is achieved. The user can continuously watch the monitor 38 until the proper pose is achieved. Once the proper pose is achieved, then the shutter operating button 140 is depressed. Operation of this button 140 causes the strobes 56 and 58 to illuminate the interior of the booth B at essentially the same time that the shutter assembly 96 causes the film in the camera 92 to be exposed. Because of the optical system provided by the camera 92, which is of the looking-through the lens type, then the image exposed on the film corresponds with the image displayed on the monitor.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What I claim is:

1. A self photography system, comprising:
   (a) a film camera including an image inlet disposed on a first axis and an image outlet disposed on a second axis parallel to said first axis and further including shutter means for selectively exposing a length of film to a perceived image;
   (b) a video camera including a perceived image receiving opening disposed on a third axis generally transverse to said first and second axes;
   (c) means coupling said outlet with said video camera perceived image receiving opening for assuring transmission of the perceived image from said film camera to said video camera;
   (d) video display means operably associated with said video camera for displaying the perceived image; and,
   (e) film camera operating means operably associated with said shutter means for causing a length of film to be exposed by the perceived image displayed by said video display means.

2. The system of claim 1, wherein:
   (a) said coupling means including a prism.
3. The system of claim 1, wherein:
   (a) said operating means including a remotely located switch.
4. The system of claim 2, wherein:
   (a) a housing being mounted to said camera in alignment with said outlet; and,
   (b) said prism being a right-angle prism and being mounted in said housing.
5. The system of claim 1, wherein:
   (a) said video display means being disposed closely proximate said inlet.
6. The system of claim 1, further comprising:
   (a) a booth having an endwall;
   (b) said video display means being mounted to said endwall; and,
   (c) said endwall having an opening therethrough closely proximate said video display means and said inlet being aligned with said opening.
7. The system of claim 6, wherein:
   (a) a platform being pivotally associated with said endwall;
   (b) said film camera being mounted to said platform; and,
   (c) means being associated with said platform for causing pivoting thereof.
8. The system of claim 7, wherein:
   (a) support means being associated with said platform and pivotal therewith; and,
   (b) said video camera being mounted to said support means and pivotal therewith for assuring transmission of the perceived image from said inlet to said video camera.
9. The system of claim 7, wherein:
   (a) brace means extending from said endwall;
   (b) rod means being associated with said platform and engaged with said brace means for defining a pivot axis for said platform; and,
   (c) said rod means being disposed at one end of said platform and said pivoting means being disposed at an opposite end of said platform.
10. The system of claim 7, wherein said pivoting means including:
    (a) a sheave being mounted to said platform;
    (b) a second platform being mounted to said endwall above said first mentioned platform;
    (c) motor means being mounted to said second platform and including a rotating shaft; and,
    (d) linkage means extending from said shaft and trained about said sheave so that rotation of said shaft causes displacement of said linkage means and thereby pivoting of said first mentioned platform.
11. The system of claim 6, wherein:
    (a) a series of light means being disposed about said endwall opening for attracting the attention of a user thereto; and,
    (b) strobe means being mounted to said endwall and being in circuit connection with said operating means for providing illumination when the film is exposed.
12. The system of claim 11, wherein:
    (a) video illumination means being mounted to said endwall above said strobe means for providing illumination for said video camera.
13. A photography booth, comprising:

(a) an enclosure including an endwall with a front surface and a rear surface and a seat spaced from said endwall;
(b) a first opening in said endwall disposed above said seat;
(c) a second opening in said endwall disposed below said first opening;
(d) a film camera including a lens and an image outlet, said film camera connected to said rear surface so that said lens is aligned with said first opening;
(e) a video camera;
(f) means coupling said outlet with said video camera so that the image perceived by said lens is transmitted to said video camera;
(g) video display means mounted to said endwall in alignment with said second opening and said display means operably associated with the video camera so that the transmitted image is displayed by said video display means;
(h) film camera operating means operably associated with said film camera for exposing a length of film with the image being displayed by said display means;
(i) a platform being pivotally associated with said rear surface;
(j) said film camera being secured to said platform and pivotal therewith; and,
(k) means being operably associated with said platform for causing pivoting thereof.

14. The booth of claim 13, wherein:
(a) said lens and said outlet having parallel optical axes; and,
(b) said video camera having an optical image receiving axis transverse to said lens and outlet axes.

15. The booth of claim 13, wherein:
(a) said coupling means including a prism for directing the image from said outlet to said video camera.

16. The booth of claim 13, wherein:
(a) support means being mounted to said platform and pivotal therewith; and,
(b) said video camera being secured to said support means for maintaining alignment of said video camera with said coupling means.

17. The booth of claim 16, wherein said pivoting means including:
(a) a support secured to said rear surface above the pivot axis of said platform;
(b) motor drive means being mounted to said support and including a rotatable shaft and a reel secured to the distal end thereof and rotatable therewith; and,
(c) a flexible cord having a first portion engaged with said platform and a second portion wrapped about said reel so that rotation of said shaft causes said cord to be wound upon or from said reel for varying the length thereof for thereby causing pivoting of said platform.

* * * * *